(12) United States Patent
Salani

(10) Patent No.: US 8,172,193 B2
(45) Date of Patent: May 8, 2012

(54) APPARATUS FOR REMOVABLY SECURING SEATS

(75) Inventor: Simone Salani, Ferentino (IT)

(73) Assignee: Iacobucci HF Electronics S.p.A., Ferentino (IT)

( * ) Notice: Subject to any disclaimer, the term of this patent is extended or adjusted under 35 U.S.C. 154(b) by 0 days.

(21) Appl. No.: 13/054,001

(22) PCT Filed: Aug. 3, 2009

(86) PCT No.: PCT/IT2009/000354
§ 371 (c)(1),
(2), (4) Date: Jan. 13, 2011

(87) PCT Pub. No.: WO2010/016086
PCT Pub. Date: Feb. 11, 2010

(65) Prior Publication Data
US 2011/0121155 A1   May 26, 2011

(30) Foreign Application Priority Data
Aug. 4, 2008   (IT) .............................. RM2008A0423

(51) Int. Cl.
*F16M 13/00* (2006.01)
(52) U.S. Cl. ..................................... 248/429; 29/525.11
(58) Field of Classification Search .................. 248/429, 248/424, 423, 503.1; 410/105, 104; 29/525.11
See application file for complete search history.

(56) References Cited

U.S. PATENT DOCUMENTS

| 4,496,271 A * | 1/1985 | Spinosa et al. ................ 410/105 |
| 4,771,969 A * | 9/1988 | Dowd ......................... 244/118.6 |
| 6,902,365 B1 * | 6/2005 | Dowty .......................... 410/105 |
| 2011/0024595 A1 * | 2/2011 | Oi et al. ......................... 248/429 |
| 2011/0225773 A1 * | 9/2011 | Hearn et al. .................. 16/93 R |

FOREIGN PATENT DOCUMENTS

FR   2735443 A1 * 12/1996

OTHER PUBLICATIONS

Simin Baharlou, Feb. 8, 2011, International Preliminary Report on Patentability Chapter I (IB/373) for PCT/IT2009/000354.
Huijb Dorpema, Feb. 4, 2011, Written Opinion of the International Search Authority for PCT/IT2009/000354.
Huijb Dorpema, Feb. 11, 2010, International Search Report for PCT/IT2009/000354.
Adriana Raimondi, Apr. 15, 2011, claim amendment and response to Rule 161 Communication for EP2318276.

* cited by examiner

*Primary Examiner* — Ramon Ramirez
(74) *Attorney, Agent, or Firm* — Gavrilovich, Dodd & Lindsey LLP; Gregory P. Einhorn

(57) ABSTRACT

The invention provides a seat track fitting and a corresponding method to lock seats on a known hollow track. In one embodiment, the track is longitudinally provided with a plurality of symmetric circular-shaped openings of a diameter greater than the width of the slot opening comprises a main body mechanism and a shear plunger provided with a screw associated with an anti-loosening component, slidably arranged with respect to the main body mechanism.

20 Claims, 6 Drawing Sheets

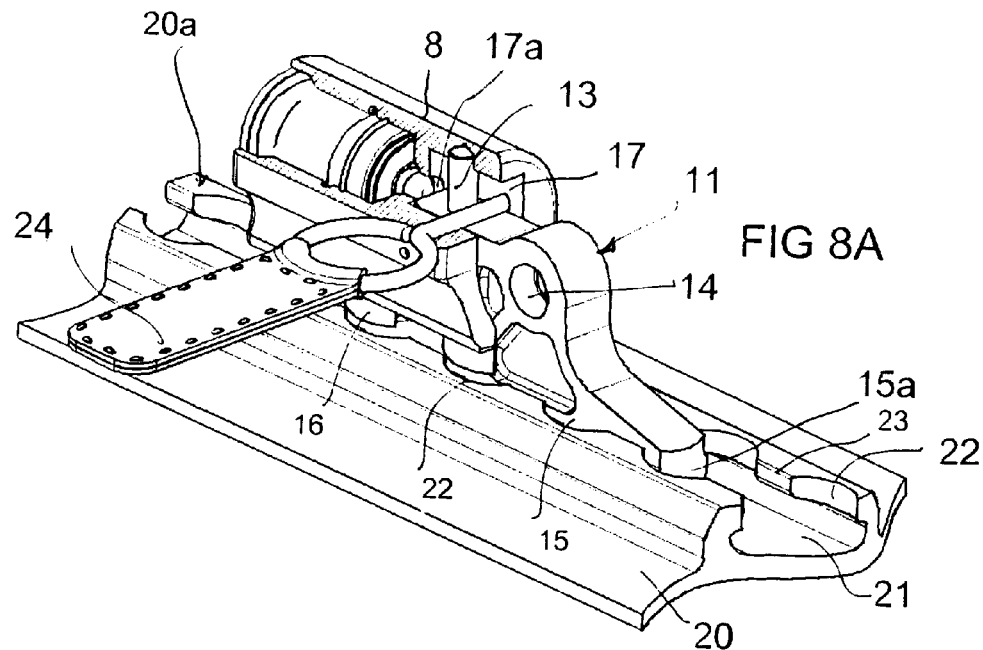
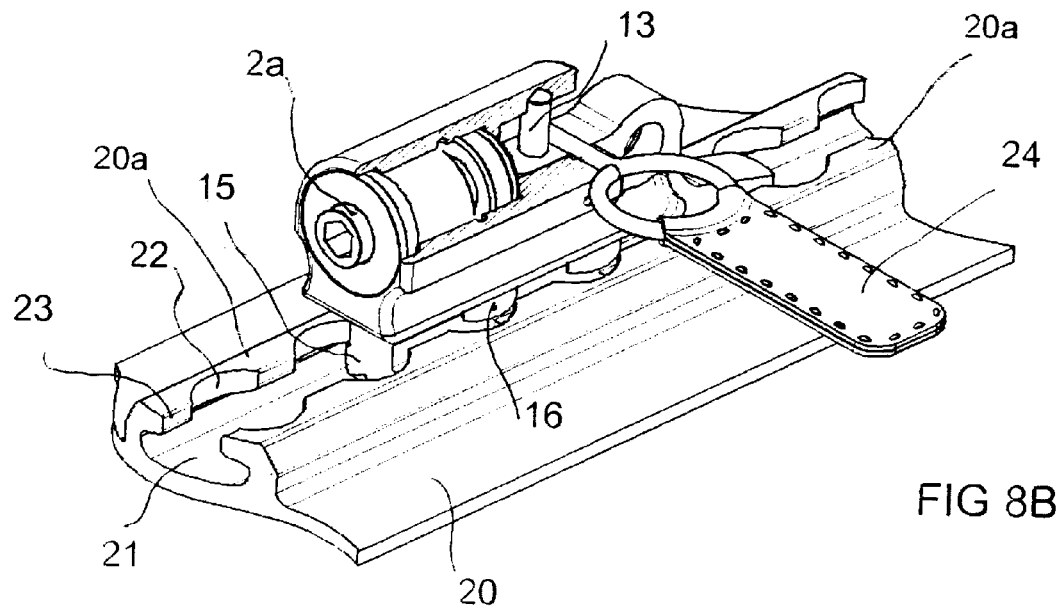

APPARATUS FOR REMOVABLY SECURING SEATS

This application is a national phase patent utility filing under 35 USC §371, for international application no. PCT/IT2009/000354, filed on Aug. 03, 2009, which claims the benefit of priority to Italian patent application serial no. RM 2008 A 000423, filed Aug. 04, 2008. The aforementioned applications are explicitly incorporated herein by reference in their entirety and for all purposes.

TECHNICAL FIELD

The present invention relates to an apparatus for removably securing seats for passenger transportation on board of aircrafts, trains, ships, and other means of transport. This mechanical fitting allows a quick, easy and safe track installation of the passenger's seats on board of aircrafts or other means of transport, even on new generation tracks, by using commercial tools easily available.

BACKGROUND

The track fitting of seats installation currently offered by the worldwide market does not offer proof installation against errors due to human mistakes, as a mere example, forgetting to fasten the fitting screws or not placing it properly into the track's holes.

The background art patents currently known are US N° 2007/0228215 and FR N° 2735443; they refer to seats track fittings endowed with a main body, in which the lower portion may be fitted into the track and locked with fitting screws to switch from the scrolling position to a blocked position on the track.

In the above mentioned documents the fitting screws work along with an axis substantially vertical, moreover there aren't any safety devices able to avoid the unintentional unlocking of the device from the tracks. Moreover, the known fitting systems do not have a safety block in case of worn out tracks. In particular, in the US patent application the seat track fittings are locked in the tracks after they have been lifted up towards the inner surface of the track, not allowing the option of regulating the track fitting, but with fixed blocking sizes so that in case of variation of the thickness of the track, for example because of wearing out, no adjustment during the fitting of the screw is possible, therefore the blockage of the system does not occur in safety terms, due to default of adaptation to wear conditions.

SUMMARY OF INVENTION

In order to overcome the above mentioned inconveniences a track seat fitting has now been devised and it is the object of this invention.

The characteristics of the device according to this invention reside in the safety features and in the prevention of risky installation errors due to human mistakes which may also lead to the detachment of the seats from the tracks during important phases, such as during the flight (taxi, take off and landing). The mechanical system of this invention also decreases maintenance costs and offers advantages thanks to the small dimensions of the device, to the reduction of weight, which is very important particularly in the aviation field, and to the quickness of use.

This invention is preferably used in the aeronautic field, although it is not to be restricted to this specific field.

The seat track fitting according to this invention, is applicable to a hollow seat track of the type having an upper slot opening running along the upper surface of the track when the track is installed, for example on board of an aircraft, since it is a track that is longitudinally provided with a plurality of symmetric circular-shaped openings, being of a diameter greater than the width of the slot opening. These circular-shaped openings are equidistantly placed along the tracks.

The track fitting comprises a main body, also named "main body mechanism" and a shear case commonly named "plunger", in which there is a screw associated with anti-loosening means, horizontally and slidably arranged with respect to the body between a sliding position and a securing position.

The main body mechanism, in turn, comprises:
an upper portion for fitting the track fitting to a seat and
a lower portion having a width fitting within the width of the track's slot and comprising fixed studs arranged at the same intervals as the circular-shaped openings in the track, where the studs have dimensions falling within the diameter of the circular-shaped openings and laterally protrude from the width of the lower portion, and where the studs are intended to lie below the track section that define the slot opening, commonly called "lip", placed between the circular-shaped openings, as seen from the seat when the track fitting is secured to the track.

The shear plunger of the device according to the invention comprises at least one screw between sliding and securing positions, which, when tightened, secures the shear plunger with respect to the main body mechanism, and further comprises a conical notched bushing with locking features, i.e. acting as anti-loosening, a retaining ring, a spacer, and one or more Belleville washers which, when the screw is tightened, cooperate to generate friction with the screw in such a way that screw does not tend to self loosening.

According to this invention, the track fitting comprises in the main body a notch into which the distal end of the screw may be inserted by tightening the screw when it is aligned with the notch, the notch being located in such a way that the distal end of the screw can only be fully inserted in it when the shear plunger is in its safety position.

The herewith invention also describes a track fitting featured in such a way that the shear plunger is slidably connected to the main body by an abutting pin fixed to the shear plunger by a locking pin, and in order to contrast the sliding of the abutting pin a spring located between the head of the abutting pin and the main body mechanism returns the shear plunger connected thereto towards the securing position.

Still according to this invention, the track fitting has a lateral pinhole passing through the whole shear plunger's width at a location which, when the shear plunger is lifted upward to allow the sliding of the track fitting against the action of the above mentioned spring, it allows insertion of a safety through pin between the searplunger and the main body mechanism which, when inserted, inhibits return of the shear plunger to the securing position.

In addition, the track fitting of the invention provides that the screw, associated to the plunger, is biased towards a loosened position by a co-axial spring acting between the plunger and the screw, so that the length of the screw is such that it's head protrudes out from the extremity of the shear plunger unless the screw is fully tightened in a locked position. The opposite happens when the screw is fully tightened with it's distal end in the notch provided in the main body mechanism. In order to monitor correctness of installation and removal of the track fitting, the head of the screw is provided with coloured marking, preferably eye-catching marking.

According to the invention the main body mechanism of the device is provided with protrusions or pins commonly named "studs", substantially placed in the bottom part of the main body. The plunger also comprises one or more couples of studs which are intercalated with the pins of the main body mechanism, of sizes that allow the placement inside the holes of the track and the locking by the track's slot, so providing the device of a further security system, cooperating to prevent sliding when the device is in a locked securing lowered position.

Additional features and dispositions will be evident in the following detailed description of the invention, with reference to the related images.

BRIEF DESCRIPTION OF DRAWINGS

FIGS. 8A and 8B are prospective views partially in section of the track fitting with the lifted plunger and the security pin in;

DETAILED DESCRIPTION OF A PREFERRED EMBODIMENT OF THE INVENTION

Figure 5:
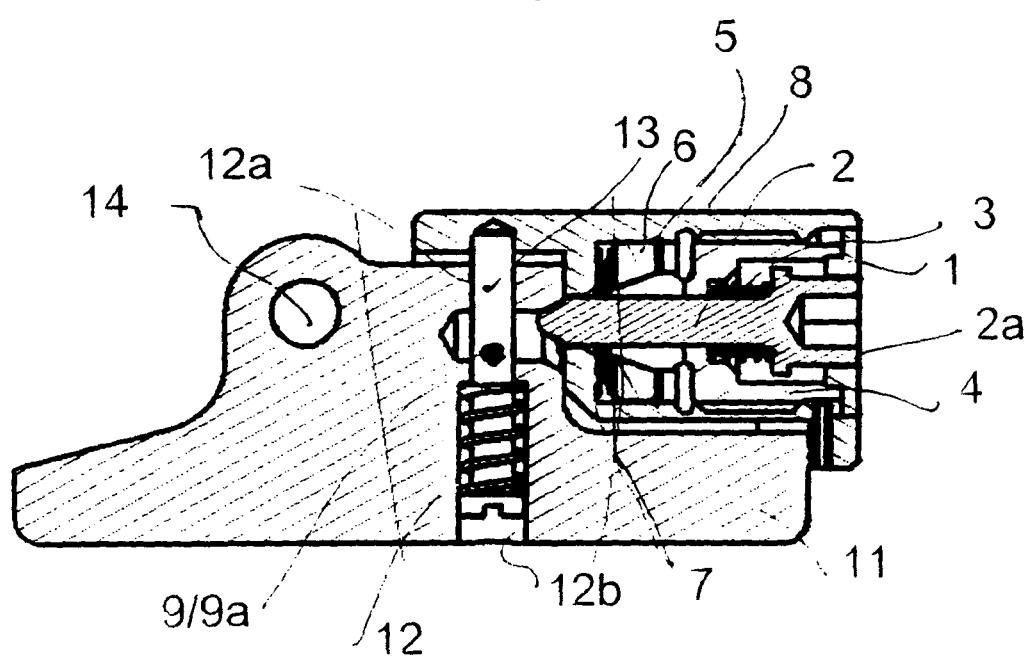
FIG. 5 schematically shows the track fitting sectioned according to the B-B plan of FIG. 4.
Figure 6:
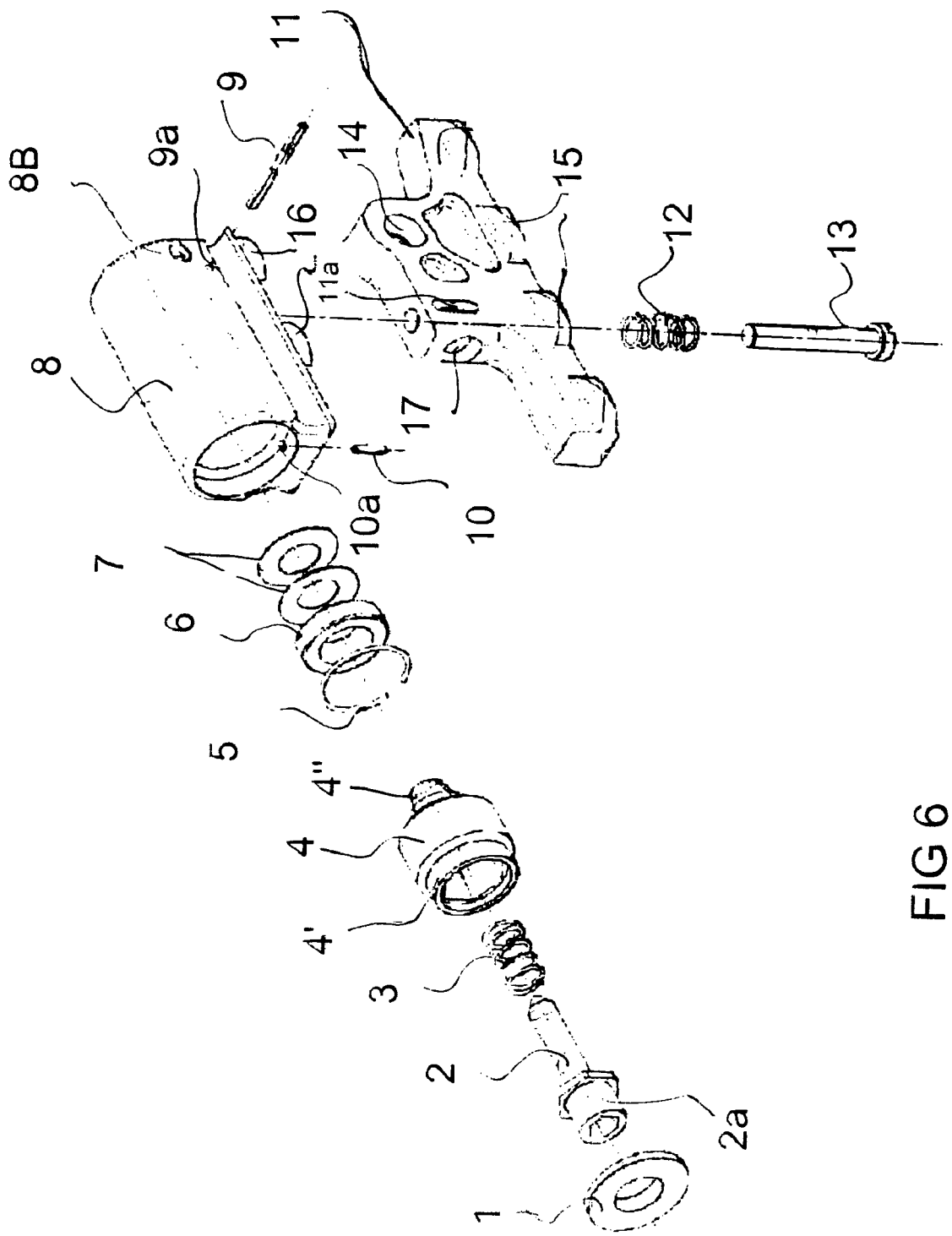
FIG. 6 schematically shows the exploded view of the track fitting.

Referring to the Figures, especially FIGS. 5 and 6, a full assembly of the quick seat track fitting is shown.

As known, an hollow track of the type having an upper slot opening running along the upper surface of the track, is longitudinally provided with a plurality of circular-shaped symmetric openings being of a diameter greater than the width of the slot opening. These circular openings are equidistantly placed along the track, e.g. installed on board of an aircraft or another means of transport.

The seat track fitting substantially comprises a shear plunger 8 in which there are: a retaining washer 1 beat stopping, inserted by pressure contour in a conical notched bushing 4; a screw 2 e.g. a socket head screw, preferably with an hexagonal head, setscrew wrench or Allen wrench; a spring 3 counteracting the screw 2; a conical notched bushing 4 with locking features; a retaining ring 5; a spacer 6 and at least a spring 7 of the Belleville washer type.

In order to lock the conical notched bushing 4 inside the shear plunger 8 a fastening pin 10 has to be inserted in a slot 10a, at the bottom of the shear plunger 8.

Associated to the above mentioned shear plunger 8, the device of the invention comprises a main body mechanism 11 in which there is a hollow notch 17 and an opening 12a-12b. The hollow notch 17 is placed longitudinally with respect to the main body 11 whereas the opening 12a-12b, is vertically and perpendicularly placed with respect to the above mentioned notch 17, in order to accommodate an abutting pin 13 on which there is a counteracting compression spring 12, placed between the bottom of the part 12b enlarged by means of the opening's spot-facing 12a and the head of the abutting pin 13.

The shear plunger 8 is also provided with an opening 9a that passes through it's whole width, in which a fastening roll-pin 9 is inserted to retain the abutting pin 13 which is free to slide vertically inside the slot openings 11a laterally placed on the main body mechanism 11, in a way that the fastening roll-pin 9 can cross the hollow notch 17 that is inside the main body mechanism 11.

Figure 3:
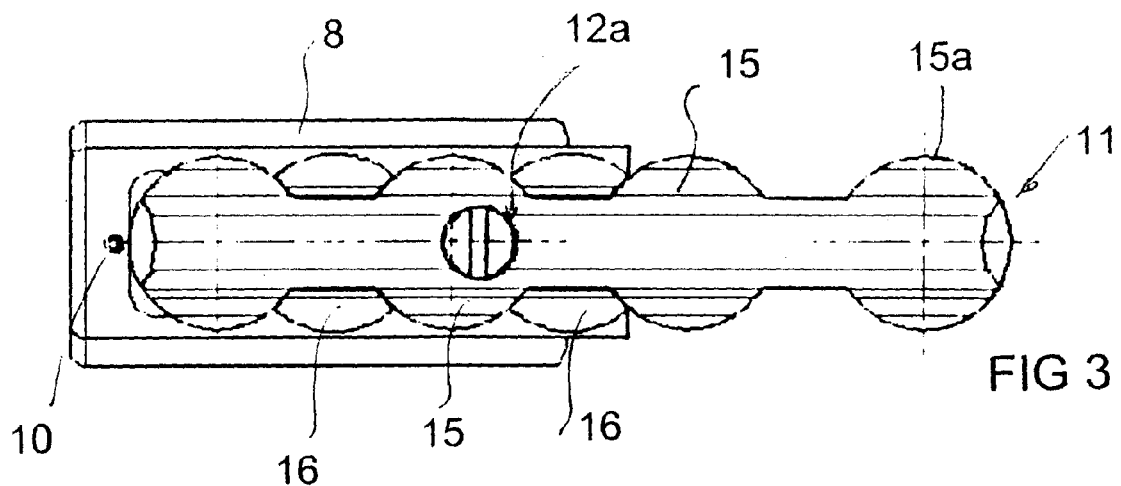
FIG. 3 schematically shows the track fitting of FIG. 1 seen from underneath.
Figure 1:
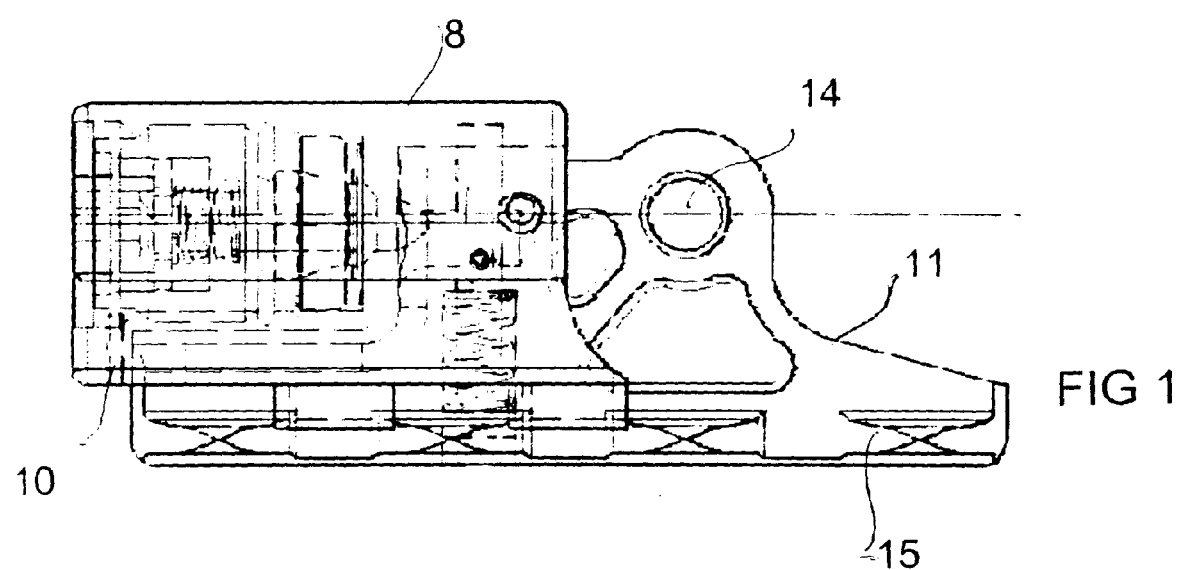
FIG. 1 is a front view which schematically shows in its whole a preferred form of the seat track fitting of the invention in a securing position.
Figure 2:
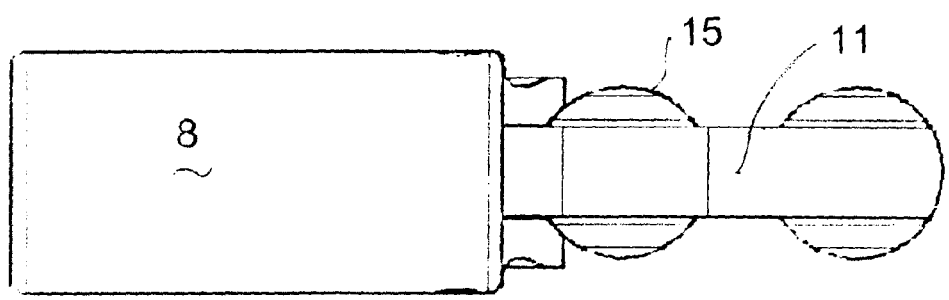
FIG. 2 schematically shows the track fitting of FIG. 1 seen from above.
Figure 4:
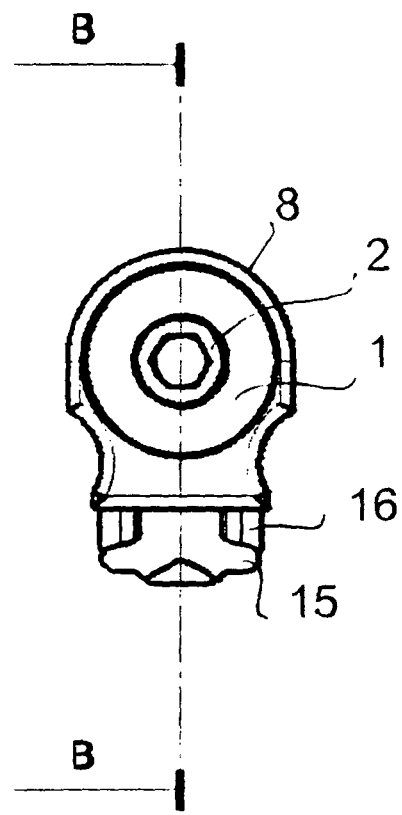
FIG. 4 schematically shows the track fitting of FIG. 1 seen from left.

The main body mechanism 11 of the quick track fitting comprises a base with one or more circular pins 15 (stud) which, during the installation are inserted inside the openings 22 of the track 20. As a mere example, in the enclosed Figures, in particular in FIG. 3 there are 4 studs 15, but it is possible to reduce this number to, for instance, a configuration of only 3 studs. This reduced configuration is obtained with a simple removal, for example, of the furthest stud 15a by means of mechanical milling.

At the bottom of the shear plunger 8 there are at least one or preferably two couples of semi-circular pins 16 commonly named "shear pin", placed on both sides, in order to guarantee a constant and continuous insertion in the openings of the track only in safety conditions, and they are at regular center-to-center distances usually equal to an inch or its multiples.

The spring 12 counteracting to the main body mechanism 11 placed on the abutting pin 13 joined to the shear plunger 8 by means of the retaining fastening pin 9 acts to constantly return the whole shear plunger 8 towards the bottom making it wedge the pins 16 ("shear pin") in the openings of the track that are encountered during the sliding of the mechanism for quick fitting. This feature of the invention solves an important issue of security installation of seats, avoiding that the seats may be installed without being definitely locked inside the tracks. As a matter of fact, the disposition according to the invention, that is, the automatic hooking, commonly named "positive lock", due to the constant downward returning action of the spring 12, guarantees that the quick fitting device is securely inserted in the track, even if the screw 2 hasn't been tightened.

The quick seat track fitting has, as extra safety feature, an anti-loosening mechanism based on the friction exerted on the screw 2 by a coaxial conical notched bushing 4 placed on the screw 2 itself. In particular, when the screw 2 is tightened, the combined action of the applied torque wrench setting, of the Belleville washers 7 and of the retaining rings 5 and 6, makes the conical notched bushing 4 tighten more and more on the body of the screw 2 till locking it as inside a friction vice. This prevents from it's loosening due to vibrations on the means of transportation.

Figure 9:
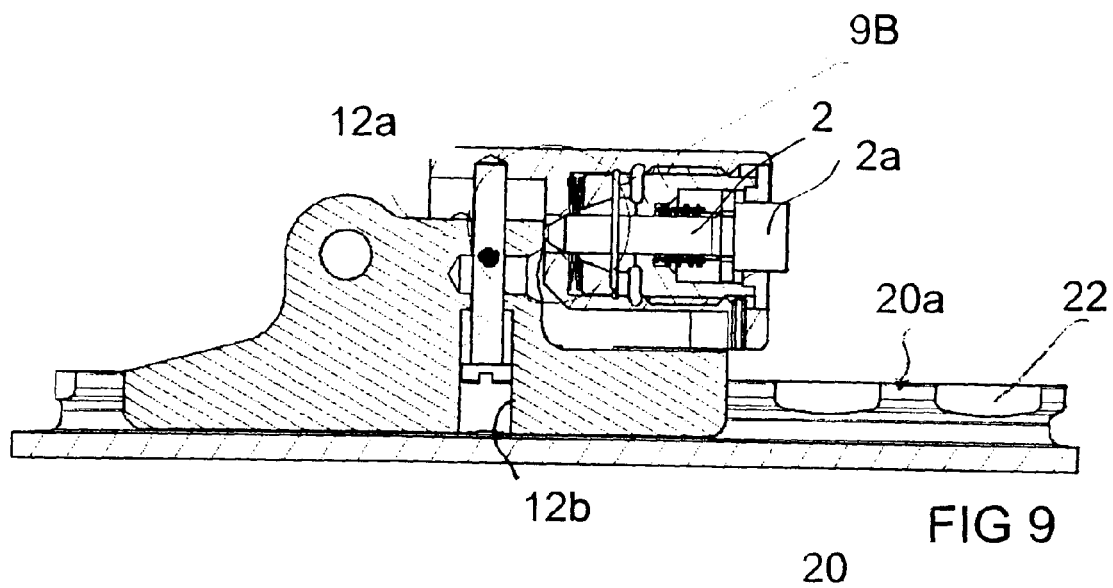
FIG. 9 schematically shows the track fitting, sectioned according to the B-B plan of FIG. 4, but not correctly installed on the track.
Figure 9A:
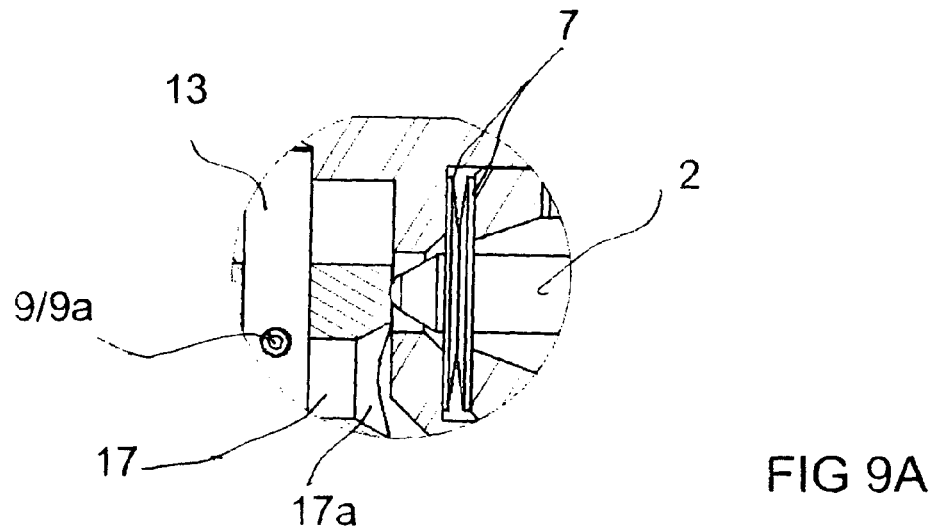
FIG. 9A shows a detail of the section of FIG. 9.

In order to avoid any kind of wrong installation and misalignment among the parts that make up the track fitting, in case the pins 16 (shear pin) placed at the bottom of the shear plunger 8 are positioned on top of the upper supporting surface 20a of the track 20 therefore the correspondent openings 22 still haven't been engaged, the screw 2 can't in any way be inserted in the initial widened part 17a of the countersunk notch 17 provided in the main body mechanism 11, as illustrated for example in FIG. 9 and in the 9A detail. This centring system prevents against a wrong locking to the track 20 of the whole track fitting. As a matter of fact, if the screw 2 was to be tightened before the above mentioned studs 15-16, respectively of the main body mechanism 11 and of the shear plunger 8, will have engaged the openings 22 of the track, it would idle in vain. Whereas, if it turns out to be possible to tighten it, even if not in the safety position, the head 2a of the screw 2 would protrude outside of the retaining washer 1, in turn inserted in the shear plunger 8, showing in this way an incorrect situation. Finally, this feature reduces to the minimum the risks due to human errors or inattention during seats installation procedures.

Referring in particular to FIGS. 8A-8B, 9-9A, the shear plunger 8 is provided with a side passing hole 8B, useful to allow the insert of any safety pin 24 available on the market, for instance similar to those used on fire extinguishers.

Still referring to FIGS. 8A-8B, 9-9A, when the shear plunger 8 is lifted and the pin 24 is inserted in the hole 8B so that the shear plunger 8 remains locked in a lifted position in order to allow the sliding of the seat, the screw 2 cannot be aligned with the initial widened part 17a of the notch 17 in the main body mechanism 11, and therefore, even in this case, it cannot be correctly tightened.

To easily check that all the seats are correctly installed on the track, the head 2a of the screw 2 is provided with a suitable colour, for instance in bright red colour or any other eye-catching colour all around it's head in order to be clearly visible when the fitting is not correctly engaged into the track, e.g. when the screw is not properly tightened, or during the removal of the safety pin 24 placed in the hole 8B; if one of these situations occurs, the head 2a of the screw 2 will protrude outside of the shear plunger 8 because of the combined action of the co-axial spring 3 that counteracts in the internal notch of the conical notched bushing 4 that this way will be visible (by means of the eye-catching colour) externally to the device.

According to a variant, if the lay out of the means of transport should require it, some of the studs or pins 15 placed on the bottom of the main body mechanism 11, e.g. the 15a stud, can be removed by milling from the main body mechanism 11, in order to reduce it's longitudinal size without compromising the seat track fitting's functionality.

The materials used (both for parts of new desing and for those available on the market), will be preferably made up of metallic alloys.

The following refers to how the seat track fitting of this invention works.

The quick seat track fitting device is initially made supportive to the front and/or rear seat base frame in a traditional way, by using the through hole 14 preferably double tapered, present in the upper part of the main body mechanism 11.

Subsequently, the shear plunger 8 is lifted upwards against the spring's action 12 acting on the abutting pin 13 and any kind of lockpin or safety pin 24 is inserted inside the side passing hole 8B along the whole shear plunger 8 width. The lockpin or safety pins 24 are easily available on the market and replaceable with any kind of stopping pin available that can be placed in the side opening.

Maintaining the circular studs 15 that are at the bottom of the main body mechanism 11 inserted in the openings 22 of a known type track 20, it is then possible to make the seat slide freely along the guide 21 of the track 20 until reaching the desired position, keeping the support on the upper surface 20a of the track 20, along the guide 21. Once reached such position, one will see to take off the lockpin or the safety pin 24 previously inserted in the hole 8B, therefore by means of the action of the spring 12 the shear plunger 8 will automatically be recalled downwards in such a way as to engage the openings 22 of the track, locking itself in position, also by means of the circular pins 16 placed at the bottom of the shear plunger 8.

As a result of this operation, the track fitting results safely inserted inside the track 20, although it is still not definitely fastened to it. This function feature, that is the constant downwards return of the shear plunger 8 by means of the spring 12, guarantees a continuous anchorage of the mechanism to each opening of the track, preventing risky situations due to forgetfulness during the installation which could lead to the detachment of the seats from the tracks. Indeed, this way, the device cannot translate along the track nor fall out of it.

Figure 7:
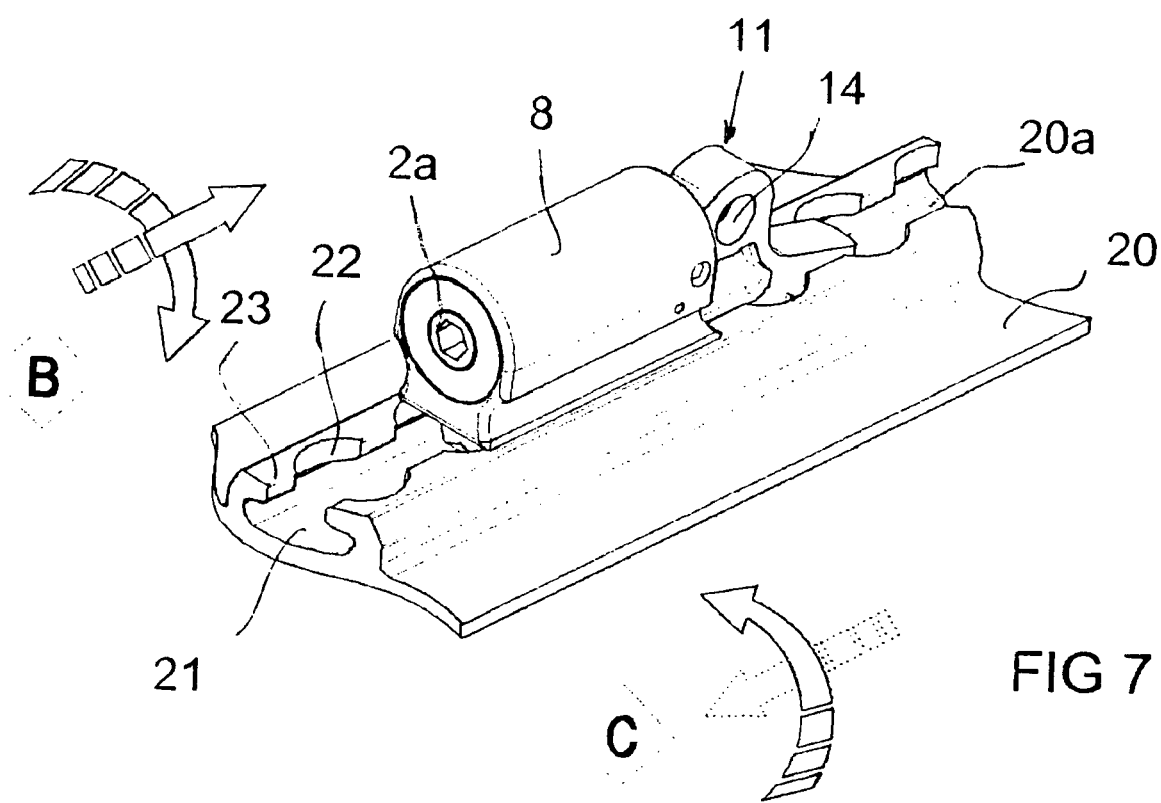
FIG. 7 schematically shows a complete prospective view of the track fitting of FIG. 1, correctly installed on a standard track.

Next, as shown in FIG. 7, the fastening of the assembly shear plunger 8-main body mechanism 11 takes place by means of the tightening of the socket head screw 2, pushing it using an Allen wrench and rotating it clockwise at the same time (towards the B arrows) until reaching the torque wrench setting desired.

Advantageously, according to the device of this invention, the cooperation between the parts together with the disposition of the anti-loosening system should be such that for the tigthening of the screw 2, therefore for the locking of the full assembly, only a quarter of turn should be required, minimizing installation time and efforts. This favourable locking feature of the screw 2 by means of the quarter of turn of the wrench takes place even in case of a worn out track.

Still referring to FIG. 7, the removing procedure has an inverted sequence compared to that just described. In particular, an Allen wrench is inserted in the head 2a of the screw 2 making it rotate in an anticlockwise direction, (towards the C arrows), until the screw 2 will automatically be pushed towards the outside by the spring 3.

If it were necessary to make the seat freely slide along the tracks, one could proceed by lifting upward the shear plunger 8 and by inserting a lockpin or safety pin 24 in the side passing hole 8B, so that the pins 16 that are at the bottom of the shear plunger 8 will not be continuously engaged with the openings 22 that are equidistantly placed along the track 20, but will allow the seat to slide freely along the whole track, also providing an extra support for it.

Referring to all the Figures from 1 to 7, in which the whole device in a correct locking position is shown, and in particular to the longitudinal section shown in FIG. 5, it is easy to understand that when the screw 2 is totally tightened, gripping the main body mechanism 11, it makes the Belleville washers pack 7 compact against the conical notched bushing 4, therefore assuring the anti-loosening of the screw 2. In addition, the tightening of the screw 2 can occur only when it is placed in the initial widened part 17a of the notch 17 located in the main body mechanism 11, it occurs only when there has been a correct installation of the whole mechanical device inside the track's openings.

If the pins 16 are placed on the upper surface 20a of the track 20, as shown in the Figures from 8A to 9A, then the screw 2 is not aligned with the initial widened part 17a provided in the main body mechanism 11, therefore it is not possible to block it, thus showing an incorrect installation of the seat.

The fitting system according to this invention can be advantageously used even if the track is worn out, guaranteeing a correct locking to the track even to those tracks having 1 mm less on top, due to abrasion as a consequence of the continuous seat cabin configuration changes or on board repairs.

The reduced size of the track fitting according to this invention is favourable in all those installation conditions, in which there are difficulties due to space (tight cabin configuration including the crew's equipment, especially on last row seats).

According to the invention the reduced weight of the fitting together with reduced size, advantageously allows to save money and minimize management costs.

The invention claimed is:

1. A seat track fitting to lock seats on an hollow track (20) of the type having an upper slot opening running along the whole upper surface of the hollow track, being the hollow track longitudinally provided with a plurality of symmetric circular-shaped openings (22) of a diameter greater than the width of the upper slot opening, said seat track fitting comprising:
a main body mechanism (11) and a shear plunger (8) provided with a screw (2) coupled with an anti- loosening means or an anti-loosening component, slidably arranged with respect to the main body mechanism (11) between a sliding position and a securing position;
wherein the main body mechanism (11) comprises:
an upper portion for tightening the seat track fitting to a seat; and a lower portion having a width fitting within the width of the hollow track's upper slot opening and comprising fixed studs (15) arranged at the same intervals as the circular-shaped openings (22) in the hollow track (20), wherein the fixed studs (15) have dimensions falling within the diameter of the circular-shaped openings (22) and laterally protrude from the width of the lower portion, and wherein the fixed studs (15) are made to lie below a track section (23) that define the upper slot opening;
and the shear plunger (8) comprises:
at least a couple of pins (16) staggered with respect to the fixed studs (15) of the main body mechanism (11); a screw (2) which acts parallel to the track by generating a friction between a sliding position and a securing position, and which upon tightening fixes the shear plunger (8) to the main body mechanism; and
a conical notched bushing (4) co-axial to the screw (2) with anti-loosening features.

2. The seat track fitting according to claim 1, wherein on the main body mechanism (11) there is a widened notch (17) shaped in such a way that, when tightening the screw (2), the distal end of the screw can be inserted only when it is correctly aligned with the notch (17).

3. The seat track fitting of claim 1, wherein the shear plunger (8) is slidably connected with the main body mechanism (11) by an abutting pin (13) fixed to the shear plunger (8) by a fastening roll-pin (9), said pin being supported by a spring (12) located between the head of the abutting pin (13) and the main body mechanism (11), in order to counteract sliding of the abutting pin (13) fixed onto it, by making the shear plunger (8) to return always towards the securing position.

4. The seat track fitting of claim 1, wherein the shear plunger is provided on one side with a passing hole (8B) which runs along its whole length in such a position as to allow inserting a passing safety pin or a spine (24) in between the shear plunger (8) and the main body mechanism (11) when the shear plunger (8) is lifted to allow shifting of the fitting device along the hollow track, temporaneaously hindering and disabling any getting back to the safely locked position of the shear plunger.

5. The seat track fitting of claim 1, wherein the screw (2), cooperates with a co-axial spring which acts in between the shear plunger (8) and the screw (2) itself in a loosened position when the screw (2) is not tightened into a locking position, so that a head (2a) of the screw (2) protrudes from the end of the shear plunger (8).

6. The seat track fitting of claim 5, wherein the head (2a) of the screw (2) is coloured or is provided with a coloured marking, in order to make evident that the assembly and removal procedures of the seat track fitting were properly carried out.

7. The seat track fitting of claim 1, wherein the anti-loosening means or anti-loosening component contained in the shear plunger (8) comprise: a retaining washer (1) that stops at beat, a screw (2), a spring (3) which antagonizes the screw (2), an anti-loosening conical notched bushing (4), and a retaining ring (5), and optionally further comprises a spacer (6) and optionally at least one cup-shaped or Belleville spring (7).

8. The seat track fitting of claim 7, wherein the shear plunger (8) is provided with an elastic pin (10) to be inserted in a slot (10a), located in a lower portion of said shear plunger with the aim to retain the anti-loosening means or anti-loosening component.

9. The seat track fitting of claim 1, wherein the shear plunger (8) is further provided with an opening (9a) that goes through the whole length of the shear plunger (8), wherein an elastic roll-pin (9) is inserted to retain an abutting pin (13) which is free to slide vertically inside the slot openings (11a) which are placed on the two sides of the main body mechanism (11), so that the roll-pin (9) can go through the hollow notch (17) inside the main body mechanism (11).

10. The seat track fitting of claim 1, wherein a base of the shear plunger (8) is provided with at least one couple.

11. The seat track fitting of claim 1, wherein the seat track filling comprises a hollow notch (17) and a hole (12a) in the main body mechanism (11), and the hollow notch (17) is placed longitudinally with respect to the main body mechanism (11) and the hole (12a) is placed vertically and at a perpendicular angle with respect to said hollow notch (17), such that an abutting pin (13) is accommodated onto which an antagonizing compression spring (12), placed in between the bottom of part (12b) which is made larger by spotfacing hole (12a) and the pin (13) head.

12. The seat track fitting of claim 1, wherein when a safety pin (24) is inserted into the shear plunger (8) such that the shear plunger (8) is kept blocked in a raised position to allow the sliding of the seat, and the screw cannot be aligned with an initial enlarged part (17a) of the notch (17) provided in the main body mechanism (11).

13. The seat track fitting of claim 1, wherein the main body mechanism (11) comprises a base comprising one or more circular fixed studs (15) which, during the installation, are inserted inside the openings (22) of the track (20).

14. The seat track fitting of claim 1, further comprising a spring (12) antagonizing the main body mechanism (11) placed on an abutting pin (13) fixed to the shear plunger (8) by an elastic retention pin (9) which constantly pushes down the shear plunger (8) to block it by a plurality of protrusions (16) into the track holes (22) which are met in the sliding of the device, to allow the automatic fastening or "positive fastening" due to the constant pushing downwards of the spring (12), which ensures that the device is safely inserted onto the track, even when the screw (2) is not tightened.

15. The seat track fitting of claim 1, wherein an anti-sliding component is made to safely work in fitting the main body mechanism (11) to the shear plunger (8) by the combination of pressure and of a quarter of a turn of the screw (2), down to the desired tightening couple, or optionally when the track is worn out, wherein optionally the screw is a hollow-head screw.

16. The seat track fitting of claim 1, wherein the seat track further comprises at least two couples of semi-circular protrusions (16) placed on each of its sides to ensure a constant and continual insertion into the holes on the track.

17. A method to fasten a seat to a hollow track using a seat track fitting of claim 1 comprising the following steps:

fixing the track fitting of claim 1 to the front and/or rear structure of a seat by using a passing hole (14) on top of the main body mechanism (11); lifting up the shear plunger (8) against the spring's action (12) provided on a pin (13) and inserting a stop or a safety pin (24) into a passing hole (8B); keeping a plurality of circular studs (15) at the base of the main body mechanism (11) inserted inside the openings (22) of the track (20), let the seat slide freely along the guide (21) of the track (20) up to the desired position, keeping an upper surface (20a) of the track (20) along the guide; in such a position, take away the safety pin (24) previously inserted into hole (81)) so that, under the action of spring (12), the shear plunger (8) is automatically pulled downwards so that the hedges with holes (22) of the track (20) are engaged, getting locked in position also by the circular protrusions (16) at the base of the shear plunger (8); as a result, the track fitting is safely inserted into the track (20), although not definitely fastened yet, the pushing downwards of the shear plunger (8) by the spring (12) ensuring a continuous fastening of the device to every hole of the track, preventing the device from sliding along the track and/or from going off it; subsequently, fastening the assembly shear plunger (8) to the main body mechanism (11) by a combination of pressure and of at least a quarter of a turn of the hollow-head screw (2), down to the desired tightening couple.

18. The method of claim 17, wherein the shift of the seat takes place by lifting up the shear plunger (8) and by inserting the safety pin (24) in the passing hole (8B), so that a plurality of protrusions (16) at the base of the shear plunger (8) are not continuously engaged in the holes (22) of the track (20), so that the seat can freely slide along the track, also providing a further support for it.

19. The method of claim 17, wherein
(a) when the screw (2) is completely tightened, catching on the main body mechanism (11), it provides to
compact the cup-shaped springs block (7) against the conical notched bushing (4), thus ensuring the counter-tightening of the same screw (2), being possible to tighten the screw (2) only when it is inserted into an initial enlarged part (17a) of the notch (17) in the main body mechanism (11), when a correct installation of the devices into the holes in the track;
(b) when the protrusions (16) are placed onto the upper surface (20a) of the track (20), the screw (2) is non aligned with the initial enlarged part (17a) provided with the main body mechanism (11) and, whereas it is not possible to tighten it, it would protrude outside the shear plunger (8), making evident an incorrect installation.

20. The method of claim 19, wherein an incorrect installation is evident when:
(i) wherein the screw (2), cooperates with a co-axial spring which acts in between the shear plunger (8) and the screw (2) itself in a loosened position when the screw is not tightened into a locking position, so that a head (2a) of the screw (2) protrudes from the end of the shear plunger (8); or
(ii) wherein the head (2a) of the screw (2) is colored or is provided with a colored marking, in or to make evident that the assembly and removal procedures of the track fitting were properly carried out; or
(c) the tightening of the shear-plunger (8)/main body mechanism (11) complex by the combination of pressure and of a quarter of a turn of the hollow-head screw (2) down to the desired tightening couple, can be done also when the track is worn out.

* * * * *